(12) United States Patent
Motoi (10) Patent No.: US 10,960,789 B2
(45) Date of Patent: Mar. 30, 2021

(54) VEHICLE SEAT

(71) Applicant: TOYOTA BOSHOKU KABUSHIKI KAISHA, Aichi (JP)

(72) Inventor: Yoshihiro Motoi, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 0 days.

(21) Appl. No.: 16/801,900

(22) Filed: Feb. 26, 2020

(65) Prior Publication Data

US 2020/0282874 A1 Sep. 10, 2020

(30) Foreign Application Priority Data

Mar. 5, 2019 (JP) .............................. JP2019-039508

(51) Int. Cl.
*B60N 2/22* (2006.01)
*B60N 2/20* (2006.01)
*B60N 2/68* (2006.01)
*B60N 2/005* (2006.01)

(52) U.S. Cl.
CPC .............. *B60N 2/20* (2013.01); *B60N 2/005* (2013.01); *B60N 2/22* (2013.01); *B60N 2/68* (2013.01)

(58) Field of Classification Search
CPC . B60N 2/005; B60N 2/68; B60N 2/22; B60N 2/20; B60N 2/10; B60N 2/12
See application file for complete search history.

(56) References Cited

U.S. PATENT DOCUMENTS

| | | | | |
|---|---|---|---|---|
| 6,986,551 | B2* | 1/2006 | Ohba | B60N 2/06 297/341 |
| 7,686,398 | B2* | 3/2010 | Yokoyama | B60N 2/3011 297/341 |
| 7,819,479 | B2* | 10/2010 | Halbig | B60N 2/206 297/378.14 |
| 7,950,741 | B2* | 5/2011 | Mitsuhashi | B60N 2/236 297/362 |
| 9,056,566 | B2* | 6/2015 | Nagura | B60N 2/236 |
| 9,315,121 | B2* | 4/2016 | Enokijima | B60N 2/2252 |
| 9,440,561 | B2* | 9/2016 | Tsuji | B60N 2/2252 |
| 10,427,576 | B2* | 10/2019 | Nozue | B60N 2/206 |
| 10,800,295 | B2* | 10/2020 | Arashi | B60N 2/68 |
| 2004/0021355 | A1 | 2/2004 | Ohba | |
| 2009/0289488 | A1* | 11/2009 | Mitsuhashi | B60N 2/682 297/354.12 |
| 2012/0325780 | A1 | 12/2012 | Kushiyama et al. | |
| 2014/0077559 | A1* | 3/2014 | Higashi | B60N 2/235 297/354.1 |

(Continued)

FOREIGN PATENT DOCUMENTS

| | | |
|---|---|---|
| JP | 2004-058928 | 2/2004 |
| JP | 2013-027922 | 2/2013 |
| JP | 2018-192861 | 12/2018 |

*Primary Examiner* — Shin H Kim
(74) *Attorney, Agent, or Firm* — Greenblum & Bernstein, P.L.C.

(57) ABSTRACT

A vehicle seat includes: a fixed frame; a tower frame arranged at a position offset from the fixed frame toward a first side along a seat-width direction; a recliner arranged between the tower frame and the fixed frame; a tilt restriction mechanism arranged opposite to the recliner relative to the fixed frame; and an abutting member arranged on a same side as the tilt restriction mechanism relative to the fixed frame.

2 Claims, 10 Drawing Sheets

(56) References Cited

U.S. PATENT DOCUMENTS

| | | | | |
|---|---|---|---|---|
| 2015/0091354 A1* | 4/2015 | Enokijima | ........... | B60N 2/2252 |
| | | | | 297/354.12 |
| 2017/0341536 A1* | 11/2017 | Uno | ......................... | B60N 2/02 |
| 2018/0141473 A1* | 5/2018 | Fujishiro | ................ | B60N 2/224 |

* cited by examiner

VEHICLE SEAT

CROSS-REFERENCE TO RELATED APPLICATIONS

The present application claims the benefit of Japanese Patent Application No. 2019-39508 filed on Mar. 5, 2019 with the Japan Patent Office, the entire disclosure of which is incorporated herein by reference.

BACKGROUND

The present disclosure relates to a vehicle seat to be mounted in a vehicle.

For example, a vehicle seat having a walk-in function described in Japanese Unexamined Patent Application Publication No. 2018-192861 is provided with a mechanism (hereinafter a "tilt restriction mechanism") to hold a back frame in a tilted state by a predetermined angle toward a seat front side. The tilt restriction mechanism does not rotate with the back frame, and is immovable, for example, relative to a cushion frame.

SUMMARY

The present disclosure provides an example of a vehicle seat that enables reduction in size of an area in which movable portions, including a back frame, are arranged.

One aspect of the present disclosure provides a vehicle seat to be mounted in a vehicle. The vehicle seat comprises a fixed frame, a tower frame, a recliner, a tilt restriction mechanism, and an abutting member. The tower frame configuring a part of a back frame extends in an approximately up-down direction, and is arranged at a position offset from the fixed frame toward a first side along a seat-width direction. The recliner configured to allow the tower frame to be rotated relative to the fixed frame is arranged between the tower frame and the fixed frame. The tilt restriction mechanism is arranged opposite to the recliner along the seat-width direction relative to the fixed frame, and comprises a restriction member to maintain a state, in which the back frame is tilted toward a seat front side by a specified angle. The abutting member is arranged on a same side as the tilt restriction mechanism relative to the fixed frame, and is configured to be displaced integrally with the tower frame. The abutting member is configured to contact the restriction member to thereby maintain a tilt angle of the tower frame.

As a result, the vehicle seat allows reduction in area to be occupied by movable portions arranged on the first side along the seat-width direction relative to the fixed frame. Thus, the area can be covered with a designed part (such as an outer surface of a seatback and a shield) of the vehicle seat, and an improved design of the vehicle seat can be achieved.

The vehicle seat may be configured, for example, as below.

Specifically, the vehicle seat may further comprise an engagement member secured to the tower frame and extending from the tower frame toward a side where the tilt restriction mechanism is arranged, and an engaged portion provided to the abutting member and configured to be engaged with the engagement member, thereby transmitting rotation of the tower frame to the abutting member. The vehicle seat with this configuration allows the abutting member to be displaced integrally with the tower frame.

BRIEF DESCRIPTION OF THE DRAWINGS

An embodiment of the present disclosure will be described hereinafter by way of example with reference to the accompanying drawings, in which.

DETAILED DESCRIPTION OF EXEMPLARY EMBODIMENTS

An embodiment described hereinafter is one example of embodiments within the scope of the accompanying claims. Matters specifying the invention that are recited in the claims are not limited to any specific configuration, structure, or the like that is shown in the embodiment described below.

The present embodiment is an example where the present disclosure is applied to a seat to be mounted in a vehicle, such as an automobile, (hereinafter referred to as a "vehicle seat"). Arrows indicating directions in the figures are shown so as to facilitate understanding of mutual relationships among the figures.

Accordingly, the vehicle seat is not limited by the directions shown in the figures. The directions shown in the figures correspond to directions in a state where the vehicle seat of the present embodiment is assembled in a vehicle.

Embodiment

1. Overview of Vehicle Seat

Figure 1:
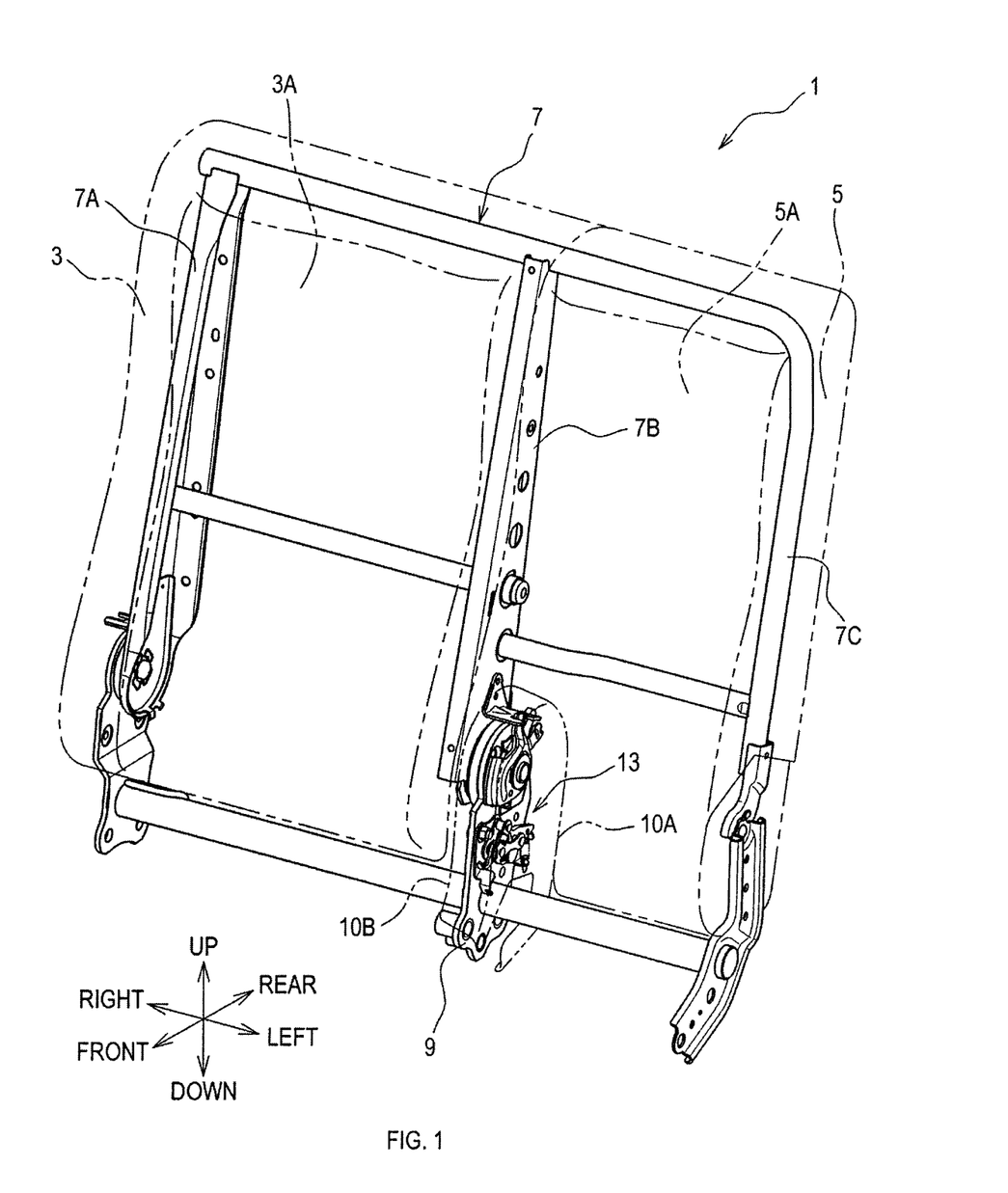
FIG. 1 is a view showing a vehicle seat of the present embodiment.

A vehicle seat 1 shown in FIG. 1 is a vehicle rear seat. The vehicle seat 1 is a bench-type vehicle seat including a side seat 3 and a center seat 5 integrated together.

The side seat 3 is a part of the vehicle seat 1 located on a first side (a right side in the present embodiment) along a vehicle width direction. The center seat 5 is a part of the vehicle seat 1 adjacent to the side seat 3.

The side seat 3 and the center seat 5 include corresponding seat cushions (not shown), seatbacks 3A, 5A, and other components. The seat cushions are for supporting an occupant's buttocks and the like. The seatbacks 3A, 5A are for supporting an occupant's back.

A back frame 7 configures frames of the seatbacks 3A, 5A. The back frame 7 comprises at least three tower frames, i.e., a first tower frame 7A, a second tower frame 7B, and a third tower frame 7C. In a neutral state as shown in FIG. 1, the first to third tower frames 7A-7C are each in an upright state extending in an approximately up-down direction like a tower.

The first tower frame 7A and the second tower frame 7B configure a frame of the seatback 3A. The second tower frame 7B and the third tower frame 7C configure a frame of the seatback 5A.

In other words, the first to third tower frames 7A-7C configure a part of the back frame 7, and the second tower frame 7B serves as a tower frame for the seatback 3A and also as a tower frame for the seatback 5A.

The first to third tower frames 7A-7C are rotatably coupled to a cushion frame (not shown). The cushion frame configures a frame of the seat cushion.

2. Coupling Structure of Second Tower Frame and Cushion Frame

<Overview of Coupling Structure>

Figure 2:
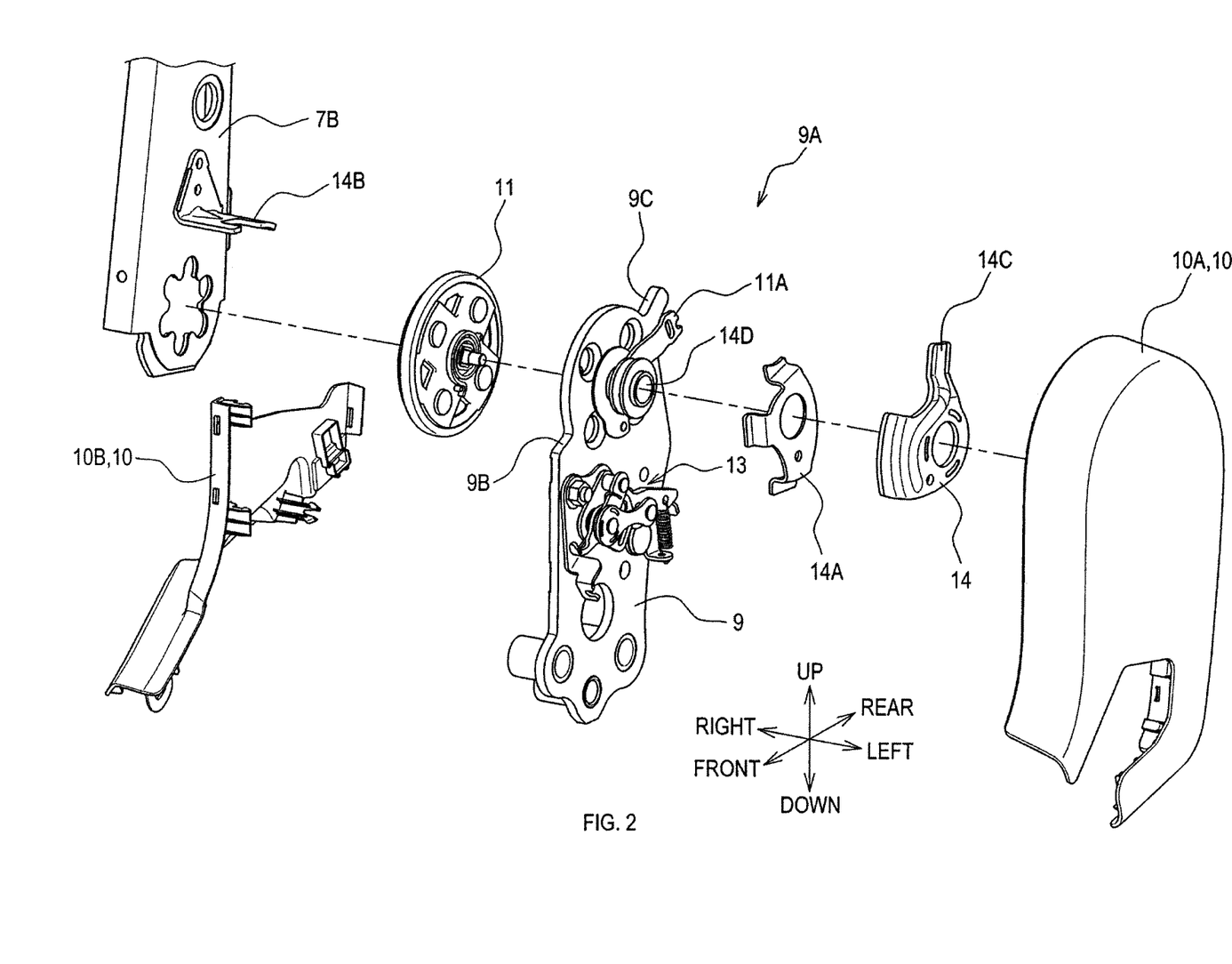
FIG. 2 is an exploded view of a coupling portion in the vehicle seat of the present embodiment.
Figure 3:
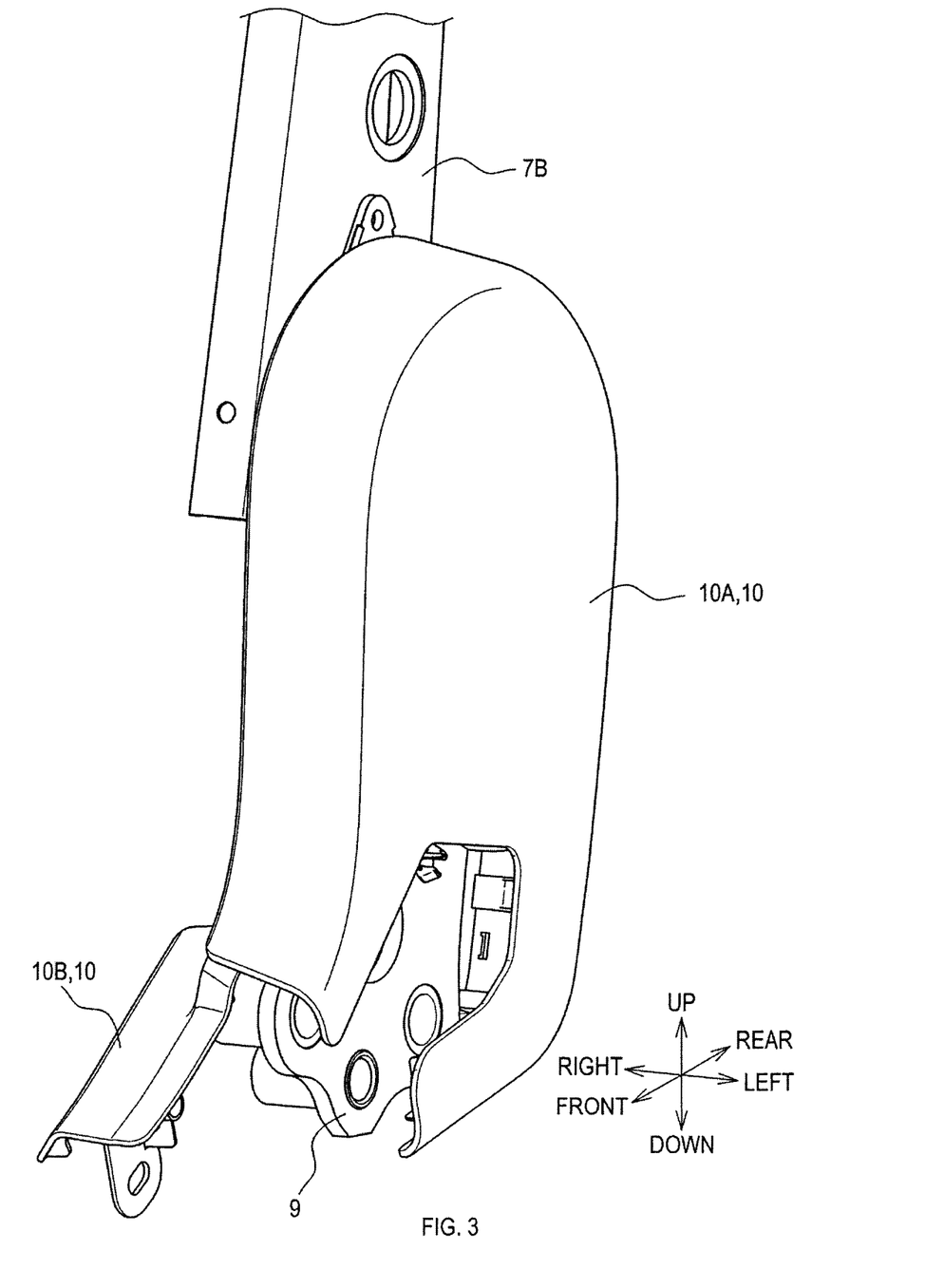
FIG. 3 is a view showing the coupling portion in the vehicle seat of the present embodiment.

The second tower frame 7B and the cushion frame are coupled through a fixed frame 9 shown in FIG. 2. A coupling portion 9A for coupling the second tower frame 7B and the fixed frame 9 is covered with at least one shield 10 as shown in FIG. 3.

The shield 10 of the present embodiment comprises a first shield 10A and a second shield 10B. The first shield 10A covers the coupling portion 9A from a side of the center seat 5. The second shield 10B covers a lower end part of the coupling portion 9A (the fixed frame 9) from a side of the side seat 3.

That is, the second shield 10B is arranged on a first side along the seat-width direction relative to the fixed frame 9 (on a seat right side in the present embodiment), and the first shield 10A is arranged on a second side along the seat-width direction relative to the fixed frame 9 (on a seat left side in the present embodiment).

<Details of Coupling Structure>

Figure 4:
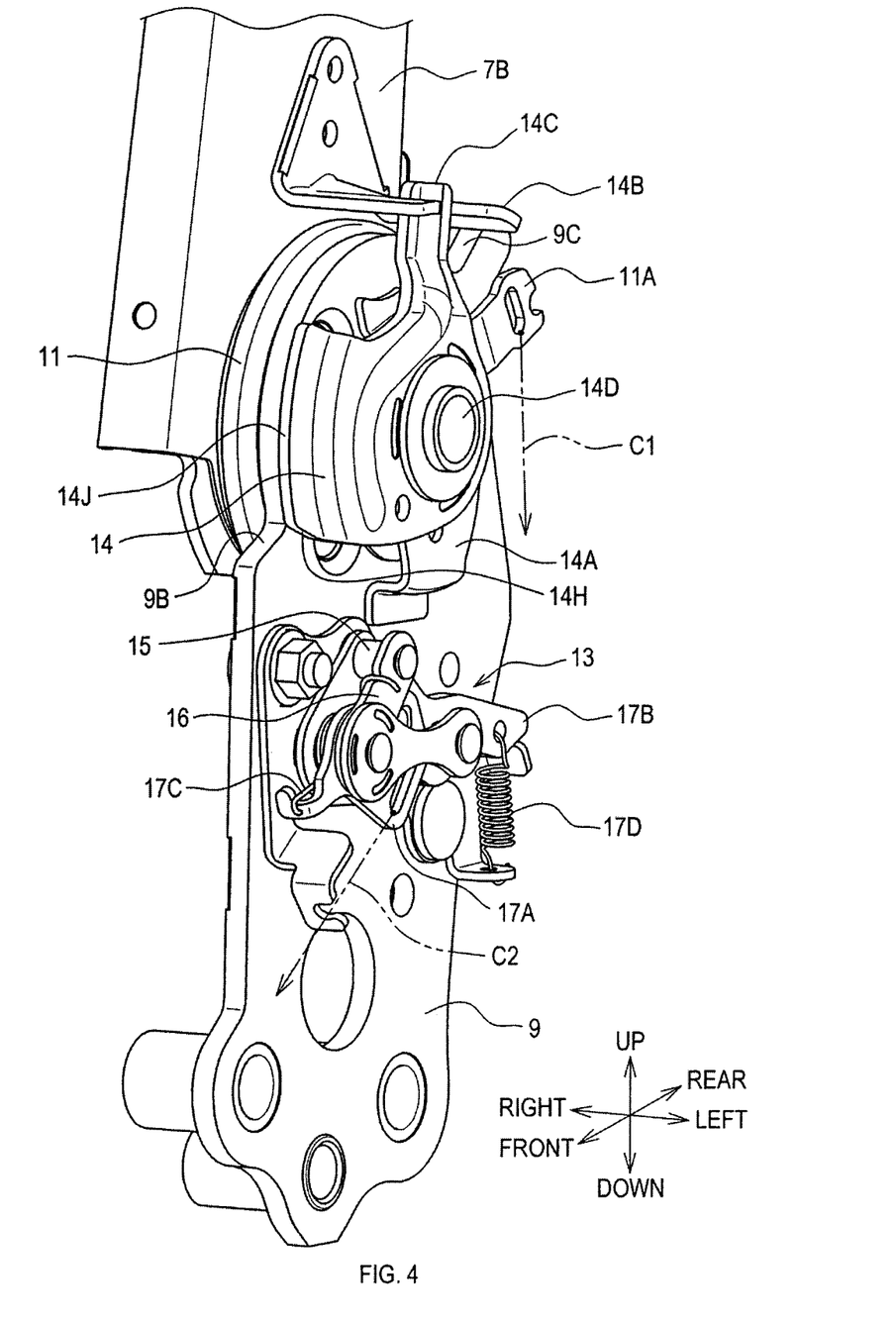
FIG. 4 is a view showing the coupling portion in the vehicle seat of the present embodiment.

As shown in FIG. 4, the second tower frame 7B and the fixed frame 9 are coupled through a recliner 11. The recliner 11 is arranged on a same side as the second tower frame 7B relative to the fixed frame 9.

That is, the second tower frame 7B and the recliner 11 are arranged on the first side along the seat-width direction relative to the fixed frame 9. The recliner 11 is arranged between the second tower frame 7B and the fixed frame 9.

The recliner 11 is a device to change between a condition enabling rotation of the second tower frame 7B relative to the fixed frame 9 and a condition disabling the rotation. The recliner 11 comprises a ratchet (not shown) having inner teeth, and a pair of pawls (not shown) each having a toothed portion to engage with the inner teeth.

Tilt springs (not shown) are provided to the back frame 7 (at lower ends of the first tower frame 7A and the third tower frame 7C in the present embodiment). The tilt springs each provide an elastic force to tilt the first to third tower frames 7A-7C toward a seat front side. The tilt springs in the present embodiment are each configured by a spiral spring having a spiral shape.

As shown in FIG. 4, a tilt restriction mechanism 13 is provided on an opposite side to the recliner 11 relative to the fixed frame 9 along the seat-width direction, that is, on a side of the first shield 10A. The tilt restriction mechanism 13 is configured to maintain a tilt angle of the second tower frame 7B.

Specifically, when a control cable C1 is operated directly or indirectly by a user and a release lever 11A is rotated, the ratchet and the pawls in the recliner 11 are brought into a disengaged state. In the disengaged state, the back frame 7, i.e., the second tower frame 7B is rotated and tilted toward the seat front side by the elastic forces of the tilt springs.

More specifically, when the ratchet and the pawls in the recliner 11 are in an engaged state, the second tower frame 7B is maintained in a neutral state (see FIG. 5) by engagement of the ratchet with the pawls.

Figure 6:
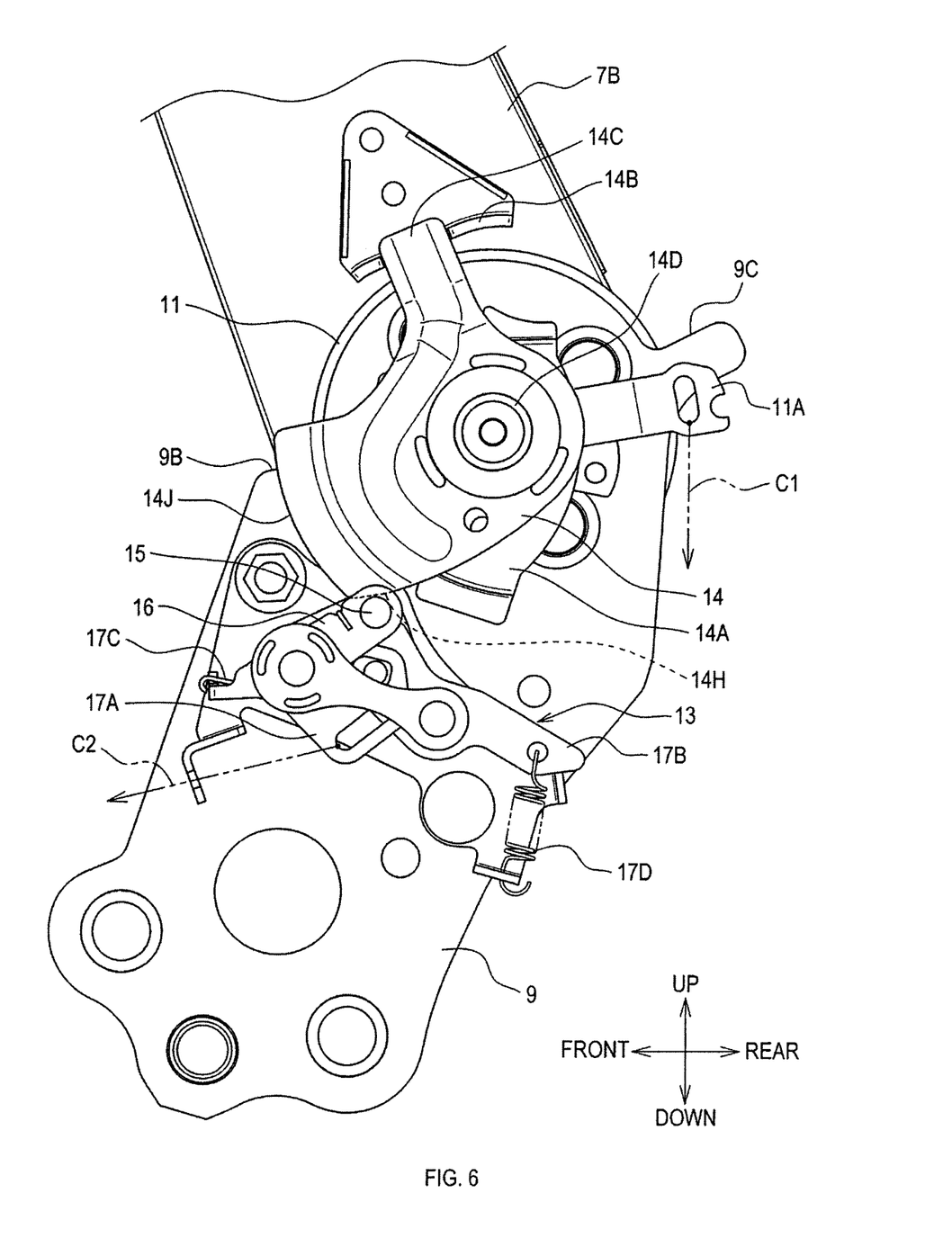
FIG. 6 is a view showing the coupling portion in the vehicle seat of the present embodiment.

When the ratchet and the pawls are in the disengaged state, the second tower frame 7B is tilted toward the seat front side by the elastic forces of the tilt springs. In this case, as shown in FIG. 6, the tilt angle of the second tower frame 7B is maintained at a specified angle by contact between a restriction member 15 and an abutting member 14.

The restriction member 15 is provided to the tilt restriction mechanism 13 to maintain the back frame 7 (including the second tower frame 7B) in a state tilted at a specified angle toward the seat front side.

The abutting member 14, which is configured to be displaced integrally with the second tower frame 7B, is arranged on a same side as the tilt restriction mechanism 13 relative to the fixed frame 9, that is, on the second side along the seat-width direction relative to the fixed frame 9.

Specifically, as shown in FIG. 4, the abutting member 14 is rotatably supported by a shaft 14D arranged coaxially with the recliner 11. The shaft 14D is provided to a base bracket 14A. The base bracket 14A is secured to the fixed frame 9.

The abutting member 14 comprises an engaged portion 14C having a protruding shape. The engaged portion 14C engages with an engagement member 14B, thereby transmitting rotation of the second tower frame 7B to the abutting member 14. In the present embodiment, the engaged portion 14C is integrally formed with the abutting member 14 by plastic forming, such as press forming.

Figure 8:
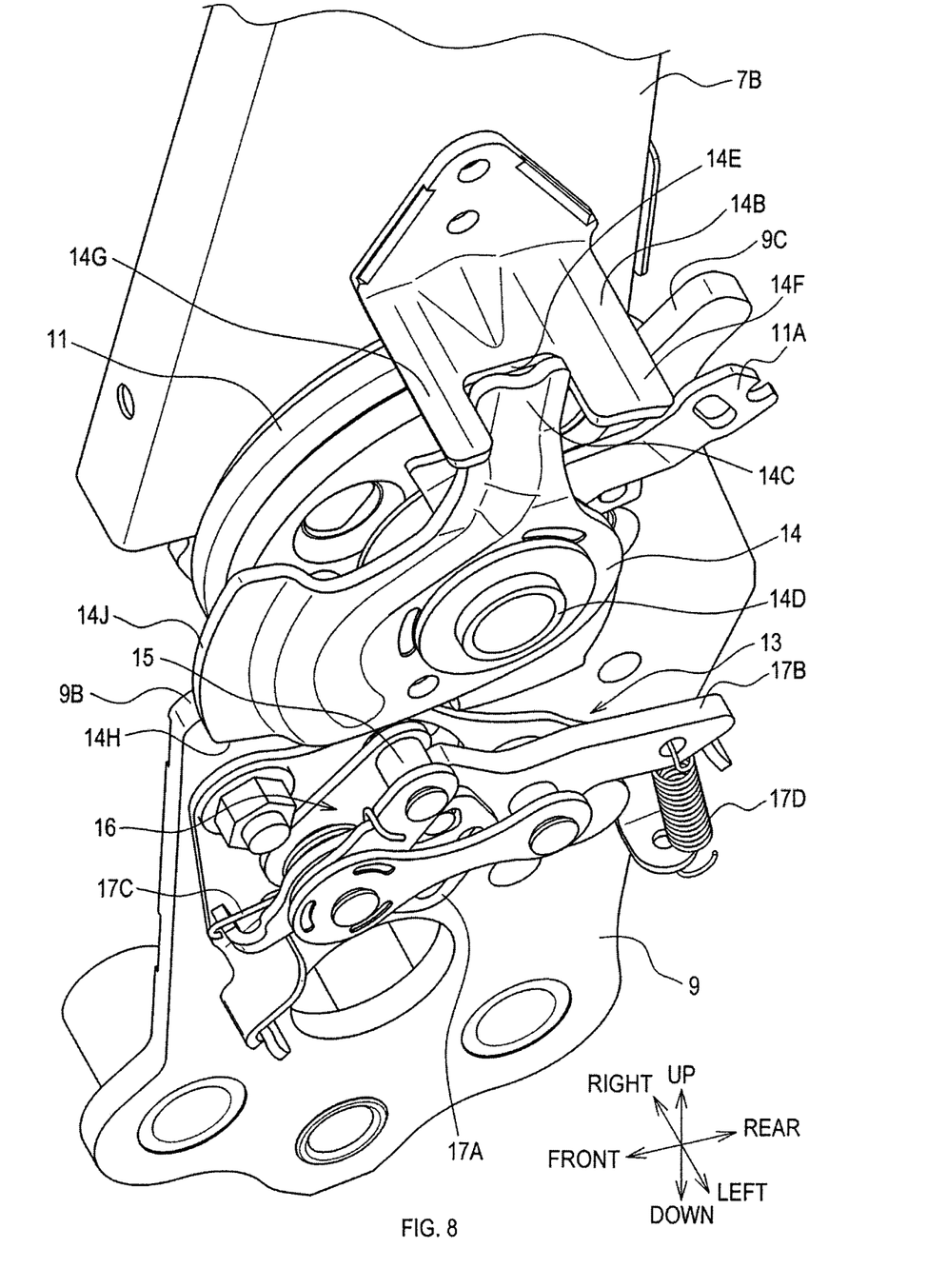
FIG. 8 is a view illustrating an operation of the coupling portion in the vehicle seat of the present embodiment.

The engagement member 14B is secured to the second tower frame 7B and extends from the second tower frame 7B toward a side where the tilt restriction mechanism 13 is arranged. As shown in FIG. 8, the engagement member 14B comprises a first projection 14F, a second projection 14G, and a recess 14E into which the engaged portion 14C is engaged. The first projection 14F and the second projection 14G form the recess 14E.

In other words, the engaged portion 14C is positioned between the first projection 14F and the second projection 14G along a rotational direction. Thus, regardless of which direction the second tower frame 7B is rotated, the rotation of the second tower frame 7B is transmitted to the engaged portion 14C.

Figure 7:
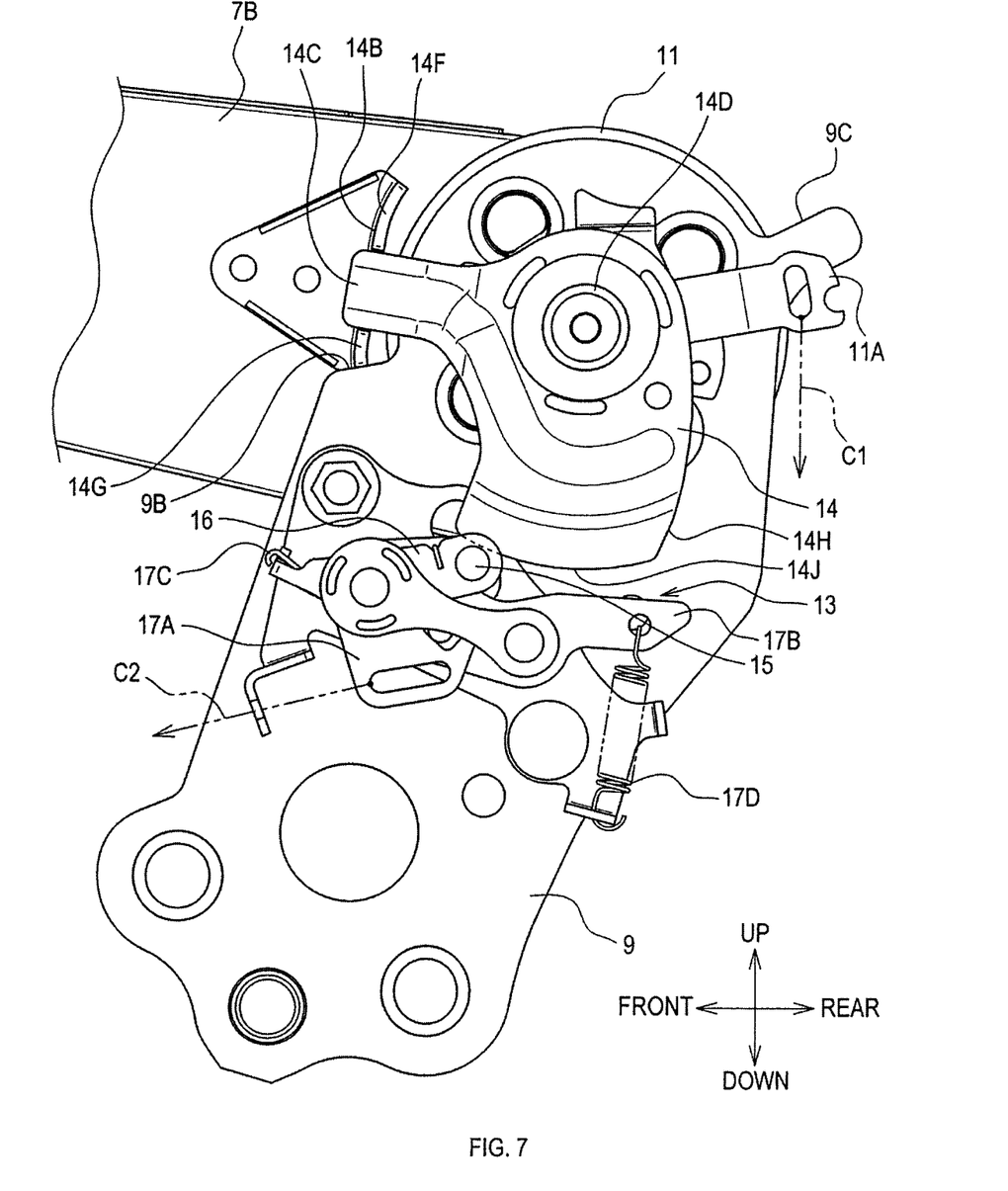
FIG. 7 is a view illustrating an operation of the coupling portion in the vehicle seat of the present embodiment.

The engagement member 14B (the first projection 14F and the second projection 14G) contacts a first abutment portion 9B or a second abutment portion 9C as shown in FIG. 7, thereby restricting a rotation range of the second tower frame 7B.

Figure 5:
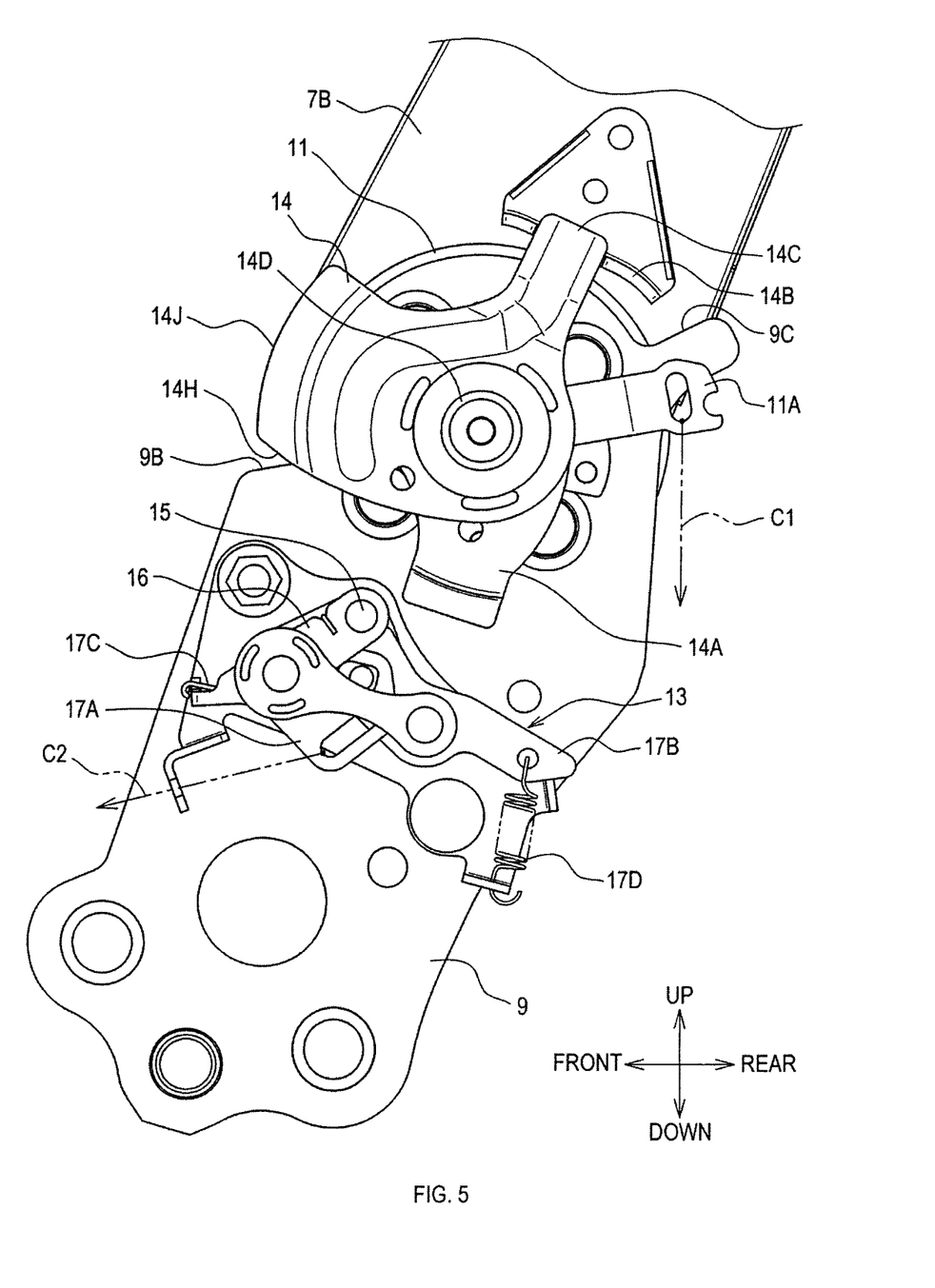
FIG. 5 is a view showing the coupling portion in the vehicle seat of the present embodiment.

As shown in FIG. 5, the abutting member 14 comprises a first cam surface 14H and a second cam surface 14J that are contactable with the restriction member 15. In a first holding state in which the first cam surface 14H contacts the restriction member 15, the second tower frame 7B is held at a first specified angle (see FIG. 6).

In a second holding state in which the second cam surface 14J contacts the restriction member 15, the second tower frame 7B is held at a second specified angle (see FIG. 7). In the second holding state, the second tower frame 7B is tilted toward the seat front side more than in the first holding state.

When a control cable C2 is operated directly or indirectly by a user, the restriction member 15 is displaced from a position shown in FIG. 6 to a position shown in FIG. 7. As a result, the second tower frame 7B is transferred from the first holding state to the second holding state.

<Configuration of Tilt Restriction Mechanism>

Figure 9:
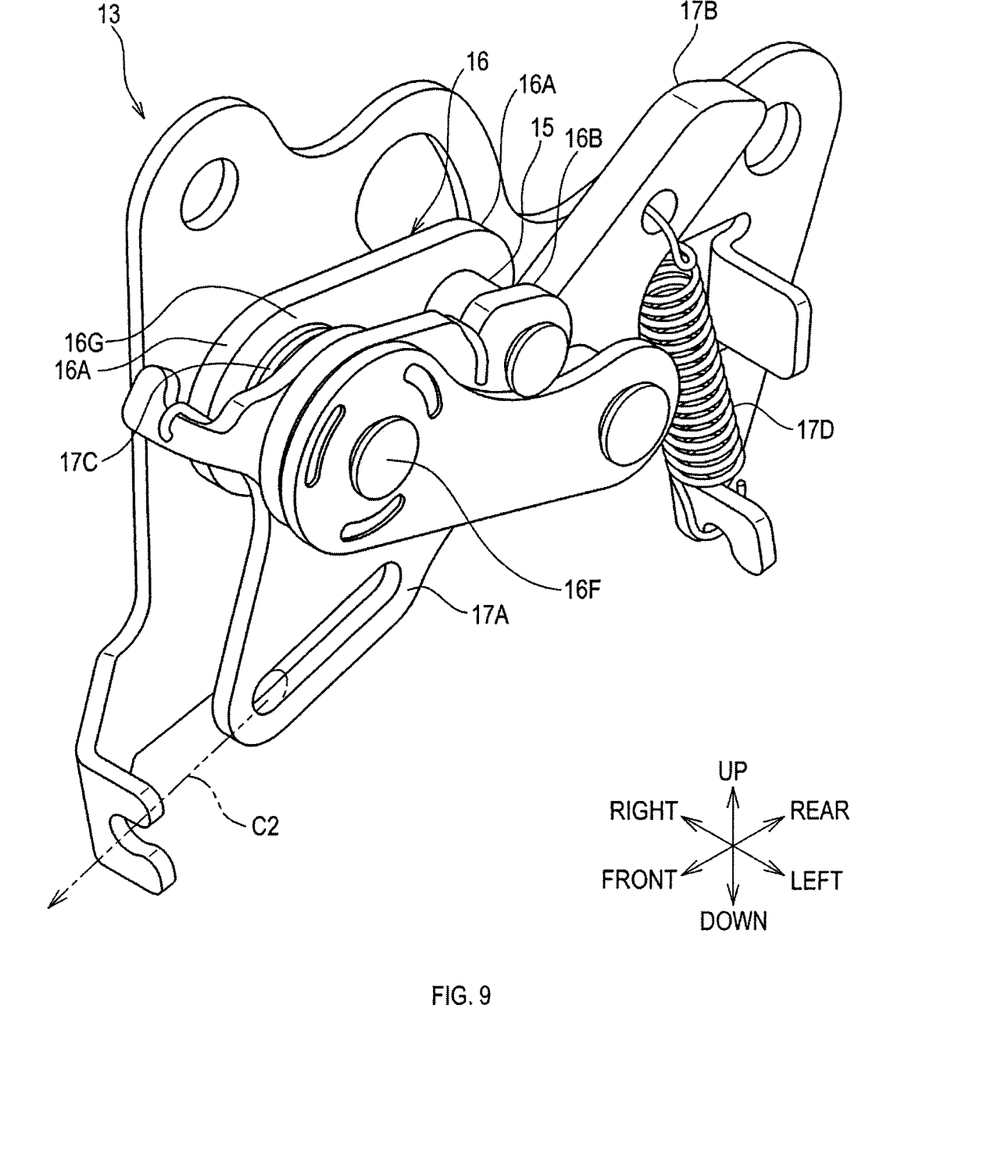
FIG. 9 is a view showing a tilt restriction mechanism of the present embodiment.

The tilt restriction mechanism 13 is arranged below the second tower frame 7B (see FIG. 5). As shown in FIG. 9, the tilt restriction mechanism 13 comprises the restriction member 15, a rotation arm 16, and other components.

The rotation arm 16 supports the restriction member 15 such that the restriction member 15 can rotate relative to the fixed frame 9. The rotation arm 16 comprises at least a first arm 16A and a second arm 16B. The first arm 16A is rotatably coupled to the fixed frame 9.

The second arm 16B is rotatably coupled to the fixed frame 9 at a position apart from the first arm 16A toward the second side along the seat-width direction.

A coupling pin 16F couples the first arm 16A and the second arm 16B to the fixed frame 9 in a rotatable manner. The first arm 16A and the second arm 16B support the restriction member 15 on a distal end side in an extending direction of the first arm 16A, that is, on a side opposite to the coupling pin 16F.

Components, including a first operating lever 17A, a second operating lever 17B, and a first return spring 17C, are arranged in a space 16G between the first arm 16A and the second arm 16B. The first operating lever 17A and the second operating lever 17B are partially exposed from the space 16G at respective different positions along a rotational direction of the space 16G.

The first return spring 17C provides a first elastic force to rotate the restriction member 15 through the rotation arm 16. The first elastic force is applied in a direction of moving the restriction member 15 away from the second tower frame 7B (downward in the present embodiment).

The first operating lever 17A and the second operating lever 17B each rotate in response to receiving an operation force from the control cable C2. A rotation center of the first operating lever 17A is at a position that is opposite to the second tower frame 7B relative to the restriction member 15 (lower side in the present embodiment) and is also offset from the restriction member 15 along a seat front-rear direction (toward the seat front side in the present embodiment).

A rotation center of the second operating lever 17B is at a position that is opposite to the second tower frame 7B relative to the restriction member 15 (lower side in the present embodiment) and is also opposite to the rotation center of the first operating lever 17A along the seat front-rear direction (seat rear side in the present embodiment).

The second operating lever 17B contacts the restriction member 15 from the opposite side to the second tower frame 7B relative to the restriction member 15, that is, from below. Thus, the first return spring 17C presses the restriction member 15 against the second operating lever 17B.

The second return spring 17D provides a second elastic force to rotate the second operating lever 17B. The second elastic force is applied in a direction of moving the restriction member 15 to approach the second tower frame 7B (upward in the present embodiment). The first operating lever 17A is rotated in response to receiving the operation force from the control cable C2, thereby rotating the second operating lever 17B in a direction opposite to the direction of the second elastic force.

<Schematic Operation of Tilt Restriction Mechanism>

Figure 10:
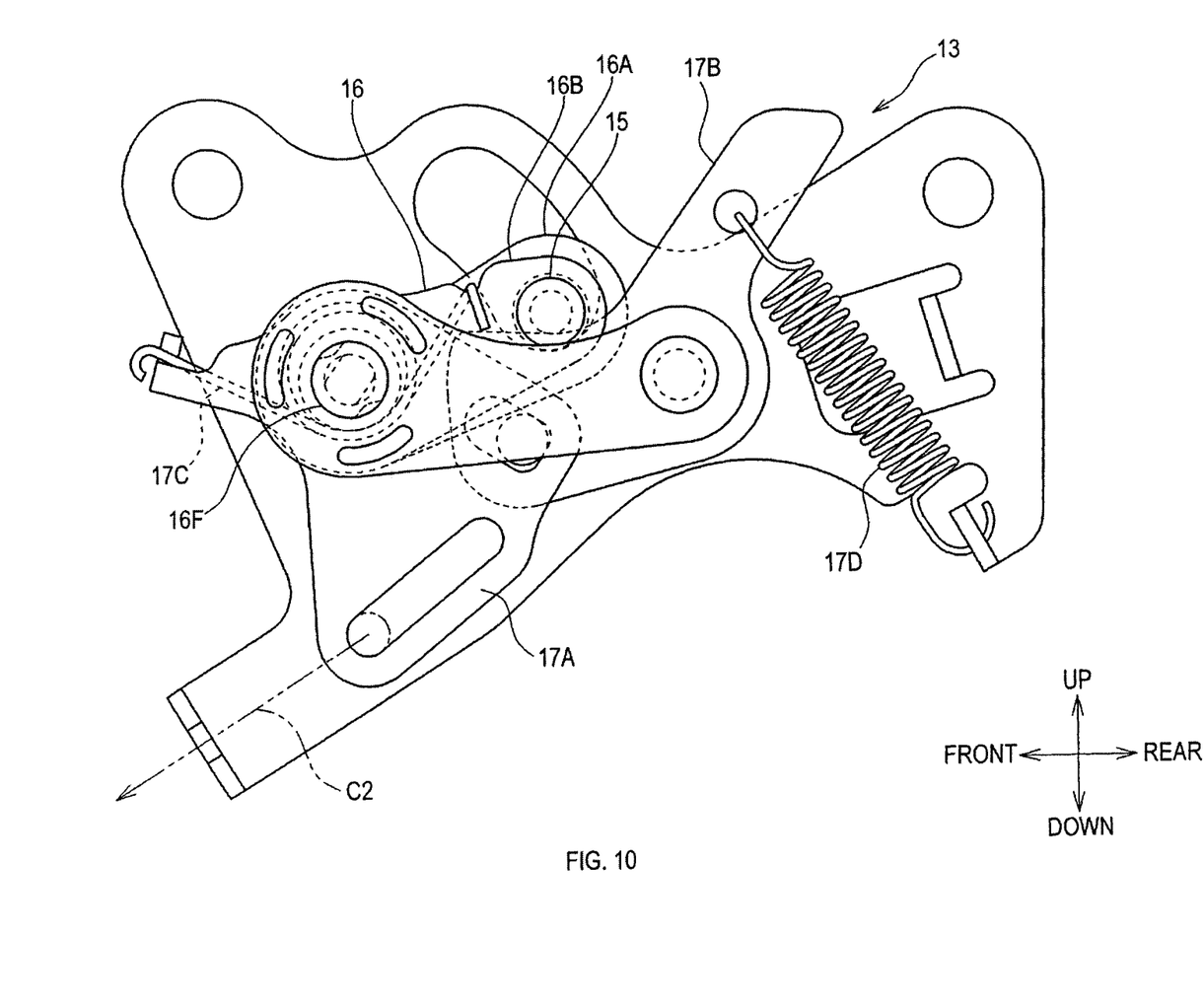
FIG. 10 is a front view of the tilt restriction mechanism of the present embodiment.

In FIG. 10, if the control cable C2 is operated by an occupant, and a tensile force is applied to the first operating lever 17A, the first operating lever 17A is rotated in a direction of the tensile force. Then, a contact portion between the second operating lever 17B and the restriction member 15 moves away from the second tower frame 7B.

As a result, the restriction member 15 is displaced downward to separate from the second tower frame 7B. Thus, the abutting member 14 and the restriction member 15 separate from each other, and the second tower frame 7B becomes rotatable.

When the operation force of the control cable C2 is released, the first operating lever 17A and the second operating lever 17B return to respective original positions by the second elastic force, and the restriction member 15 is displaced upward to approach the second tower frame 7B. Thus, the restriction member 15 becomes contactable with the first cam surface 14H or the second cam surface 14J.

When the ratchet and the pawls of the recliner 11 are in the engaged state, the restriction member 15 does not contact the abutting member 14 regardless of whether the operation force of the control cable C2 is applied. That is, in the engaged state, the tilt angle of the second tower frame 7B is maintained by the engagement of the ratchet and the pawls.

3. Features of Vehicle Seat of Present Embodiment

In the vehicle seat 1 of the present embodiment, the abutting member 14 configured to be displaced integrally with the second tower frame 7B is arranged on the same side as the tilt restriction mechanism 13 relative to the fixed frame 9.

The vehicle seat 1 configured as described above can reduce an area to be occupied by movable portions arranged on the first side along the seat-width direction relative to the fixed frame 9. Thus, the area can be covered with a designed part (the first shield 10A in the present embodiment) of the vehicle seat 1, and an improved design of the vehicle seat 1 can be achieved.

The vehicle seat 1 comprises the engagement member 14B extending from the second tower frame 7B toward the side where the tilt restriction mechanism 13 is arranged, and the engaged portion 14C that is engaged with the engagement member 14B to transmit the rotation of the second tower frame 7B to the abutting member 14. The vehicle seat 1 with such configuration enables the abutting member 14 to be displaced integrally with the second tower frame 7B.

Other Embodiments

The abutting member 14 of the above-described embodiment is configured such that the rotation of the second tower frame 7B is transmitted through the engagement member 14B secured to the second tower frame 7B and the engaged portion 14C provided to the abutting member 14. However, the present disclosure is not limited to such configuration. Specifically, for example, the abutting member 14 of the present disclosure may be secured to the second tower frame 7B.

The tilt restriction mechanism 13 of the above-described embodiment comprises at least the rotation arm 16 configured to rotationally displace the restriction member 15. However, the present disclosure is not limited to such configuration, and the tilt restriction mechanism 13 may have any other configuration.

In the above-described embodiment, a vehicle seat of the present disclosure is applied to an automobile seat. However, application of the present disclosure should not be limited thereto. Rather, the present disclosure may be applied also to seats for use in various vehicles, including railroad vehicles, ships and boats, and aircrafts, as well as stationary seats for use in theaters, homes, and other places.

Further, the present disclosure is not limited to the above-described embodiment, but may be implemented in various forms within the scope of the subject matter of the present disclosure recited in the appended claims. Accordingly, two or more embodiments may be combined, and some of the elements shown in the drawings or described with reference to assigned reference numerals in the above-described embodiments may be omitted.

What is claimed is:

1. A vehicle seat to be mounted in a vehicle, the vehicle seat comprising:
    a fixed frame;
    a tower frame configuring a part of a back frame, the tower frame extending in an approximately up-down direction and being arranged at a position offset from the fixed frame toward a first side along a seat-width direction;
    a recliner configured to allow the tower frame to be rotated relative to the fixed frame, the recliner being arranged between the tower frame and the fixed frame;
    a tilt restriction mechanism arranged opposite to the recliner along the seat-width direction relative to the fixed frame, the tilt restriction mechanism comprising a restriction member to maintain a state, in which the back frame is tilted toward a seat front side by a specified angle; and
    an abutting member arranged on a same side as the tilt restriction mechanism relative to the fixed frame and configured to be displaced integrally with the tower frame, the abutting member being configured to contact the restriction member to thereby maintain a tilt angle of the tower frame.

2. The vehicle seat according to claim 1, further comprising:
    an engagement member secured to the tower frame and extending from the tower frame toward a side where the tilt restriction mechanism is arranged; and
    an engaged portion provided to the abutting member and configured to be engaged with the engagement member thereby to transmit rotation of the tower frame to the abutting member.

* * * * *